(12) United States Patent
Dantlgraber

(10) Patent No.: US 7,351,053 B2
(45) Date of Patent: Apr. 1, 2008

(54) DRIVE UNIT

(75) Inventor: Joerg Dantlgraber, Lohr (DE)

(73) Assignee: Bosch Rexroth AG, Stuttgart (DE)

( * ) Notice: Subject to any disclaimer, the term of this patent is extended or adjusted under 35 U.S.C. 154(b) by 0 days.

(21) Appl. No.: 10/569,261

(22) PCT Filed: Oct. 15, 2004

(86) PCT No.: PCT/DE2004/002305

§ 371 (c)(1),
(2), (4) Date: Mar. 30, 2006

(87) PCT Pub. No.: WO2005/044539

PCT Pub. Date: May 19, 2005

(65) Prior Publication Data

US 2006/0280832 A1    Dec. 14, 2006

(30) Foreign Application Priority Data

Oct. 30, 2003  (DE) ................................ 103 50 955
Nov. 27, 2003  (DE) ................................ 103 55 328

(51) Int. Cl.
*B29C 45/17*    (2006.01)

(52) U.S. Cl. .................... 425/542; 60/545; 60/565; 425/556; 425/589; 425/590

(58) Field of Classification Search ............... 425/542, 425/556, 589, 590; 60/545, 565
See application file for complete search history.

(56) References Cited

U.S. PATENT DOCUMENTS

| | | | | |
|---|---|---|---|---|
| 3,611,502 A | * | 10/1971 | Florjancic | .................... 425/590 |
| 4,030,299 A | * | 6/1977 | Reuschel et al. | ............. 60/560 |
| 6,439,875 B1 | * | 8/2002 | Morita et al. | ................ 425/590 |
| 6,884,057 B2 | * | 4/2005 | Dantlgraber | ................. 425/590 |
| 6,935,111 B2 | * | 8/2005 | Dantlgraber | ................. 60/565 |
| 2004/0037915 A1 | | 2/2004 | Dantlgraber | |
| 2004/0081722 A1 | | 4/2004 | Dantlgraber | |

FOREIGN PATENT DOCUMENTS

| | | |
|---|---|---|
| DE | 101 21 024 A1 | 11/2001 |
| DE | 102 52 046 A1 | 5/2004 |
| EP | 1 310 346 A1 | 5/2003 |
| JP | A 2000-334799 | 12/2000 |

\* cited by examiner

*Primary Examiner*—James D. Mackey
(74) *Attorney, Agent, or Firm*—Oliff & Berridge, PLC

(57) ABSTRACT

A drive unit, in particular for a closing unit, an injection unit, or an ejector of an injection molding machine, may be used where a high axial force is applied through a hydraulic power converter. A cylinder of the power converter may be fixed relative to a frame of the injection molding machine through the intermediary of a holding device which is functionally separate from guidance of the cylinder on the frame of the injection molding machine.

12 Claims, 1 Drawing Sheet

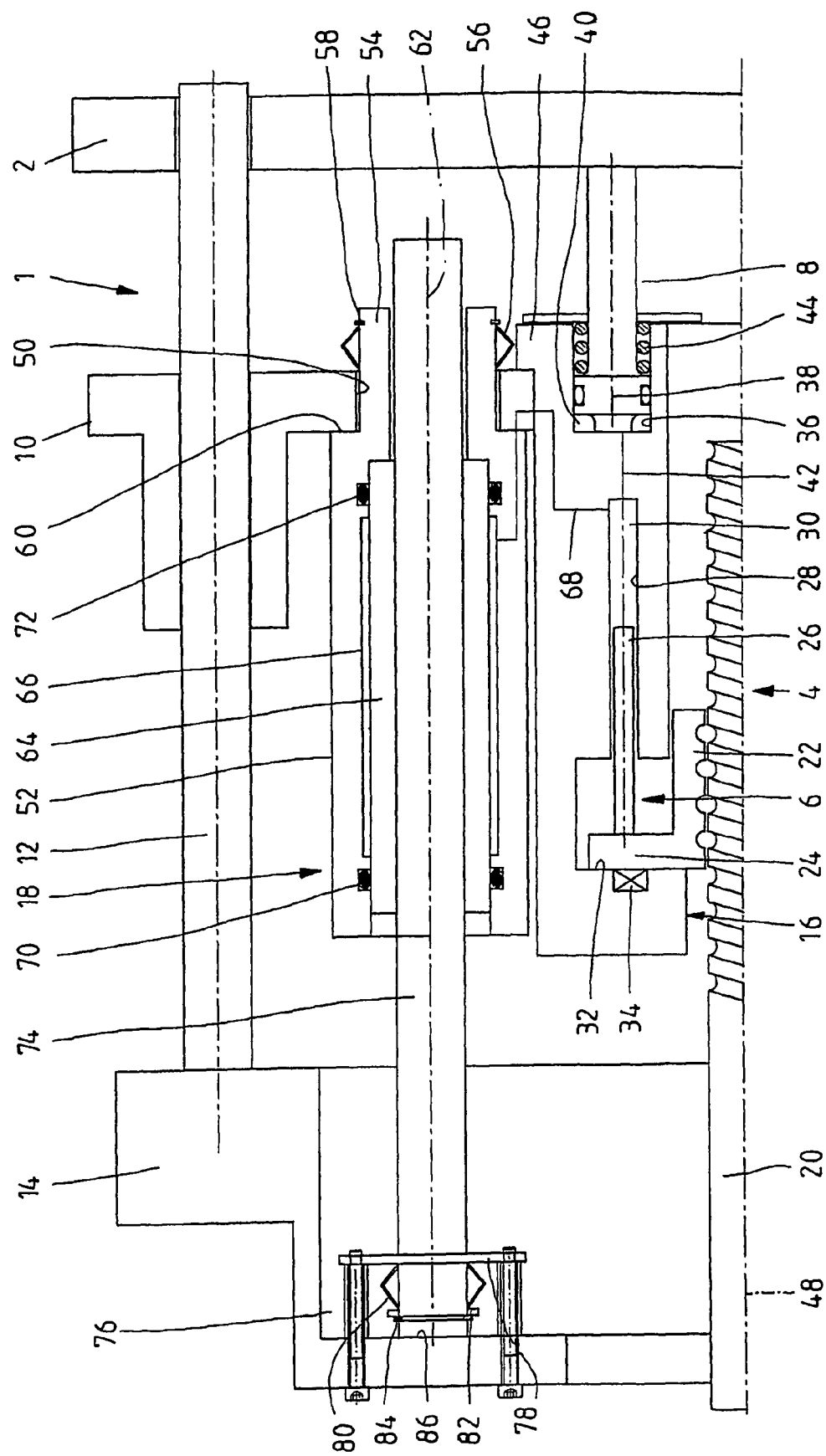

DRIVE UNIT

BACKGROUND

The invention concerns a drive unit, in particular for a closing unit, an injection unit, or an ejector of an injection molding machine.

Recently there is a tendency to provide injection molding machines with electric and hydraulic drive mechanisms, wherein high-velocity actuation movements are carried out by the electric drive mechanism at comparatively low forces, while the hydraulic drive mechanism is particularly advantageous when high axial forces must be applied at comparatively minor actuation movements.

Such requirements occur, for instance, in a closing unit or an injection unit or in the actuation of ejectors of a plastics injection molding machine. For example in order to inject plastics into a tool cavity, a preplastifying spindle is moved at a relatively high axial velocity in a direction towards the mold until the mold is completely filled with plastic material. During the subsequent dwell pressure phase, in which workpiece shrinkage is compensated by supplying molding material, a high force must be applied via the injection unit in the absence of a substantial axial advance of the preplastifying spindle.

The requirements are similar in a closing unit for closing the mold of an injection molding machine, wherein the movable platen is initially moved rapidly for closing the mold through the intermediary of the electric drive mechanism, and then only a short residual stroke must be passed through for completely closing the molding tool and keeping it closed with the required closing force.

From DE 101 21 024 A1 to the present applicant a drive unit of an injection molding machine is known, wherein the comparatively high axial forces while keeping the injection molding tool closed or during the dwell pressure phase upon injection are applied through the intermediary of a hydraulic power converter. This hydraulic power converter includes a piston unit having a comparatively small effective surface that is actuated through a spindle arrangement. The smaller piston unit delimits a pressure chamber jointly with another piston unit having a larger effective surface and an axially displaceable cylinder. The cylinder may be locked for the application of high axial forces, so that due to the axial movement of the smaller piston unit the pressure chamber is reduced in size and, in accordance with the difference of surface area between the smaller piston unit and the larger piston unit, a high axial force is applied by the latter onto the unit to be actuated (closing unit/injection unit/ejector). Axial fixation of the cylinder of the power converter is effected, in the known solution, in that a cylinder wall is bulged in a radially outward direction by the rising pressure in the pressure chamber, so that the cylinder is held by frictional grip in a guide means of the cylinder and thus cannot perform an axial movement any more.

SUMMARY

It is a drawback in this solution that the guide surfaces for the cylinder must be designed on the one hand with a view to optimal guidance, and on the other hand, however, also with a view to frictional locking of the cylinder. It is therefore necessary to find a compromise between optimal guidance and a good clamping effect, so that a design of the construction with a view to optimum performance of either one or the other function (clamping, guiding) is not possible.

In contrast, the invention is based on the object of furnishing a drive unit for an injection molding machine wherein guidance and frictional locking of an intermediate part of a power converter of the drive unit are improved in comparison with the prior art.

This object is achieved through a drive unit having the features of the claimed invention.

The drive unit of the invention comprises a power converter with two piston units that are movable relative to each other and have different effective surfaces. These delimit a pressure chamber jointly with a displaceably guided intermediate part. In order to apply a high axial force, the intermediate part is adapted to be fixed, through the intermediary of a clamping member, at a supporting member supported on the frame of the injection molding machine. In other words, the elements positively fixing the intermediate part—supporting member/clamping member—are formed separate from the guide means of the intermediate part, so that these components may be adapted optimally for the respective task (guiding/clamping), while no functional compromises whatsoever are necessary any more.

In a preferred embodiment, the supporting member supported on the frame of the injection molding machine comprises a support anchor along which a radially deformable clamping sleeve is movable. This clamping sleeve is in operative connection with the intermediate part such that when the clamping sleeve is fixed on the support anchor, the intermediate part is also locked in the axial direction.

The radial deformation in the clamping sleeve is preferably achieved hydraulically by means of the pressure prevailing in the pressure chamber. To this end, in a preferred solution of the invention the clamping sleeve is received in a clamping cylinder, the annular pressure chamber of which is connected with the pressure chamber of the power converter via a pressure line.

Guiding of the intermediate part and also of the clamping sleeve or of the clamping cylinder, respectively, is preferably achieved by means of a guide plate which may be guided on rods of the injection molding machine.

In one practical example having a particularly simple structure, this guide plate contacts the clamping cylinder on the one hand and the intermediate part on the other hand.

Complexity of the apparatus for realizing the invention may be reduced further if the support anchor and/or the clamping sleeve are resiliently biased in the direction of their respective supported positions.

The construction in accordance with the invention allows lubrication of the guide plate, so that the service life of the apparatus is quite considerably increased in comparison with the conventional solution, in which lubrication of the guide means was not possible for otherwise the clamping effect would have been impaired.

The intermediate part of the power converter preferably has the form of a cylinder wherein the pistons of the two piston units having smaller and larger effective surfaces and the pressure chamber are executed.

Further advantageous developments of the invention are subject matter of further subclaims.

In the following a preferred practical example of the invention shall be explained by referring to a schematic drawing which shows a schematic sectional view of a closing unit of an injection molding machine. In the FIGURE, merely the upper half of the symmetrically constructed drive unit 1 is represented.

BRIEF DESCRIPTION OF DRAWINGS

FIG. 1 is a schematic illustration of an exemplary embodiment of the claimed invention.

DETAILED DESCRIPTION OF EMBODIMENTS

The drive unit 1 represented in the single FIGURE serves for actuating the closing unit of an injection molding machine, wherein a movable molding tool platen 2 initially is to be moved at a high velocity (rapid operation) in the closing direction, and then, when the movable molding tool half contacts the molding tool half clamped onto a fixed molding tool platen, the remaining residual stroke and locking of the molding tool are to be performed with a high force.

The drive unit 1 comprises a power converter 4 having a piston unit 6 with a smaller effective surface and a power converter piston 8 with a larger effective surface. A cylinder 16 of the power converter 4 is guided through the intermediary of a guide plate 10 on rods 12 which are mounted on a frame 14 of the injection molding machine, and on which the movable molding tool platen 2 is moreover mounted. In order to apply high axial forces to the molding tool platen 2, the cylinder 16 of the power converter 4 may be fixed relative to the frame 14 by a holding means 18.

Actuation of the power converter 4 is performed in the represented practical example with the aid of a spindle drive comprising a spindle 20 which is driven through the intermediary of an electric drive mechanism (not shown) including a gear or belt drive. The spindle 20 fixed in the axial direction meshes with a spindle nut 22. In the represented solution, the spindle drive is designed as a circulating ball drive. The spindle nut 22 includes a radially projecting support flange 24 on which a multiplicity of pistons 26 of the piston unit 6 are supported. Instead of several pistons 26 it is also possible to use a single piston.

The right-hand end portion of the piston 26 in the FIGURE plunges into a respective cylinder chamber 28, so that the latter defines a partial pressure chamber 30 jointly with the associated piston 26. The single partial pressure chambers 30 of the power converter 4 are hydraulically connected with each other and are part of a pressure chamber whose volume may be varied by axial displacement of the pistons 26.

In accordance with the FIGURE, the cylinder 16 encompasses the spindle nut 22 and is in contact with the end face of the support flange 24 by a contact shoulder 32. In the range of this contact shoulder 32 there is provided in the cylinder 16 a clutch 34, preferably an electromagnetic clutch, whereby the cylinder 16 may be coupled to the spindle nut 22 such that the axial displacement thereof is transmitted to the cylinder 16.

In the end portion of the cylinder 16 removed from the clutch 34, an annular chamber 36 is formed on the end side in which a guide portion 38 of the power converter piston 8 having the form of a hollow piston is guided. The latter delimits together with the annular chamber 36 a power converter chamber 40 that is connected via a pressure line 42 with the partial pressure chambers 30, so that these and the power converter chamber 40 form the pressure chamber of the power converter 4.

The annular end face of the power converter piston 8 removed from the guide portion 38 attacks indirectly or directly at the movable molding tool platen 2. The power converter piston 8 is biased in the direction of a minimum volume of the power converter chamber 40 through the intermediary of a spring 44 arranged in the annular chamber 36 and attacking at the guide portion 38.

In accordance with the representation, the cylinder 16 has at its right-hand end portion a radially protruding drive shoulder 46 on which the guide plate 10 encompassing the cylinder 16 is supported in the axial direction.

In the represented practical example, the guide plate 10 includes one or several recesses 50 that are offset from its center axis 48 and in each of which a clamping cylinder 52 of the holding means 18 is inserted. It is preferred to distribute several of the clamping cylinders 52 on the circumference; in principle, however, for lower closing forces even a single clamping cylinder 52 is sufficient which should then, however, attack coaxially with the cylinder 16.

The clamping cylinder 52 plunges with a stepped-back end portion 54 thereof into the recess 50 of the guide plate 10. On the end portion 54 of the clamping cylinder 52 a spring 56, e.g. a cup spring assembly, is arranged, which is supported on a ring 58 on the one hand and attacks at the guide plate 10 on the other hand, so that the clamping cylinder 52 is biased with one shoulder 60 against the guide plate 10. The recess 50 is formed so as to have a certain play with the outer circumference of the end portion 54 of the clamping cylinder 52, so that a certain adjustment of the axial position (axis 62) of the clamping cylinder 52 is possible through the intermediary of the spring 56.

In this clamping cylinder 52 a clamping sleeve 64 is inserted which defines jointly with the jacket of the clamping cylinder 52 an annular chamber 66 that is connected via a connection passage 68 with the partial pressure chambers 30. In the represented embodiment, the connection passage 68 extends from the cylinder 16 via the guide plate 10 into the clamping cylinder 52. The annular chamber 66 is sealed against the outside by sealing assemblies 70, 72. The clamping sleeve 64 is designed so as to be deformable in the radial direction when the annular chamber 66 is subjected to a predetermined minimum pressure and may thus be clamped on a support anchor 74. This positive connection is adapted such that it is possible to transmit the supporting forces resulting from the locking force.

The clamping sleeve 64 encompasses the rod-shaped support anchor 74 whose right-hand end portion in the representation of the FIGURE also extends through the guide plate 10. The support anchor 74 is supported on one side at the frame 14 of the injection molding machine through the intermediary of a support means 76. In the represented practical example, the support means 76 include a support console 78 that is anchored to the frame 14 and on which a bias spring 80 is supported. The latter attacks at a support ring 82 placed on the support anchor 74 and supported there in the axial direction, e.g., by means of a spring washer 84. Through the bias spring 80 the left-hand end face of the support anchor 74 in the representation of the FIGURE is biased against a contact surface 86 of the frame 14.

The resilient positioning of the support anchor 74 and of the clamping cylinder 52 allows a simple compensation of manufacturing tolerances as the springs permit centering along the common axis 62.

The springs 56, 80 must be designed to have such a strength that the forces manifesting during opening as a result of friction on the mold and in the guiding mechanism are overcome.

In the represented practical example a multiplicity of pistons 26 is being used. Instead of these pistons it is also possible to use a single hollow piston, the annular end face of which has a substantially smaller effective surface than the end face of the power converter piston 8 received in the annular chamber 36.

For an improved understanding, the function of the drive unit 1 shall be explained.

It is assumed that the tool clamped onto the molding tool platen is opened, with the cylinder 16 either assuming the represented position or being displaced even further to the left into contact with the frame 14 while the tool is opened.

In order to close the molding tool in rapid operation, initially the clutch 34 is engaged so that the cylinder 16 is connected with the spindle nut 22. At the same time, the drive motor of the spindle 20 is activated and the latter is rotated, so that the spindle nut 24 correspondingly performs an axial advance to the right (representation). The cylinder 16 is driven through the intermediary of the clutch 34, so that the entire power converter 4 is displaced to the right, and the molding tool platen 2 is moved in the closing direction. This closing movement takes place with a comparatively high velocity, with only a low force having to be transmitted by the spindle drive.

During this axial displacement in rapid operation, the volume of the pressure chamber of the cylinder 16 formed by the partial pressure chambers 28 and the power converter chamber 40 does not change, so that the pressure in the pressure chamber correspondingly also remains constant.

Upon closing the molding tool, the clutch 34 is disengaged in order to apply a high locking force, so that during the remaining residual stroke the cylinder 16 is not driven by the spindle nut 22 any more. As a result, the pistons 26 plunge into the cylinder chambers 28, so that the volume of the partial pressure chambers 30 is reduced, and correspondingly the pressure in the pressure chamber of the cylinder 16 increases.

In order to prevent the cylinder 16 from escaping to the left, it is clamped by the holding means 18. In the represented practical example, this is achieved through the fact that owing to increasing pressure in the pressure chamber (partial pressure chambers 28, power converter chamber 40) that is also present via the connection passage 68 in the annular chamber 66, the clamping sleeve 66 is deformed inwardly in a radial direction and locked positively at the outer circumference of the support rod 74. The biased spring 44 causes a clamping force to be built up before the closing force manifests. The clamping effect is sufficient for immobilizing the cylinder 16 in the axial direction in order to build up the locking force. As a result of the increasing pressure in the pressure chamber 68, the power converter piston 8, which has a substantially larger effective surface than the piston 26, is subjected to a high force in the closing direction of the molding tool that is dependent on the surface ratio of the effective surfaces, wherein the stroke correspondingly is performed at a reduced velocity.

During the entire closing movement and during build-up of the locking force, the cylinder 16 is guided accurately on the rigid rods 12 through the intermediary of the guide plate 10. The supporting force generated by the power converter 4 through the pressure in the power converter chamber 40 and acting on the movable molding tool half is transmitted via the cylinder 16, the drive shoulder 46, the guide plate 10, and via the shoulder 60 to the clamping cylinder 52 and further via the clamping sleeve 64 to the support anchor 74 and introduced via the contact surface 86 into the frame 14 of the injection molding machine, so that secure locking of the molding tool even at high closing forces is ensured.

The construction in accordance with the invention is characterized by an extremely simple structure, wherein the loose mount of the support anchor 74 and of the clamping cylinder 52 with the aid of biased springs 80, 56 allows to avoid high tolerance demands to the construction. The demands to these springs 56, 80 are comparatively low, for these only have to transmit the frictional force and the forces for opening of the molding tool.

As guiding of the cylinder 16 is functionally separate from clamping, the guide means between the guide plate 10 and the rods 12 may be lubricated in an optimal manner. While the cylinder 16 is fixed, the deformations of the rods 12 are minimum as the geometrical accuracy of the holding means 18 is very high, and the clamping cylinder 52 and the support anchor 74 may be adjusted optimally relative to each other and to the rods 12 thanks to the loose mount.

The represented one-sided mounting of the components moreover allows for good accessibility of the drive unit and simple assembly and disassembly, so that maintenance is facilitated.

What is disclosed is a drive unit, in particular for a closing unit, an injection unit, or an ejector of an injection molding machine, wherein a high axial force may be applied through a hydraulic power converter. A cylinder of the power converter may be fixed relative to a frame of the injection molding machine through the intermediary of a holding means which is functionally separate from guidance of the cylinder on the frame of the injection molding machine.

LIST OF REFERENCE NUMERALS 1 drive unit
2 molding tool platen
4 power converter
6 piston unit
8 power converter piston
10 guide plate
12 rod
14 frame
16 cylinder
18 holding means
20 spindle
22 spindle nut
24 support flange
26 piston
28 cylinder chamber
30 partial pressure chamber
32 contact shoulder
34 clutch
36 annular chamber
38 guide portion
40 power converter chamber
42 pressure line
44 spring
46 drive shoulder
48 center axis
50 recesses
52 clamping cylinder
54 end portion
56 spring
58 ring
60 shoulder
62 axis
64 clamping sleeve
66 annular chamber
68 connection passage
70 sealing assembly
72 sealing assembly
74 support anchor 76 support means
78 support console
80 bias spring
82 support ring
84 spring washer
86 contact surface

The invention claimed is:

1. A drive unit of an injection molding machine, comprising:
a hydraulic power converter with two piston units movable relative to each other and having different effective surfaces which delimit a pressure chamber jointly with an intermediate part axially displaceable through the intermediary of guide means,
wherein the smaller piston unit is driven, and the intermediate part is adapted to be fixed relative to a stationary frame through the intermediary of a holding means in order to apply an axial force,
wherein the holding means has a clamping member that is capable of being displaced together with the intermediate part and that is frictionally lockable with at least one supporting member which is supported on the frame,
wherein the supporting member and the clamping member via which the intermediate part is lockable, are lockable without the guide means.

2. The drive unit in accordance with claim 1,
wherein the supporting member comprises a support anchor extending in parallel with rods on which the intermediate part is guided, and
wherein along the support anchor, a radially deformable clamping sleeve of the clamping member is movable within the clamping member.

3. The drive unit in accordance with claim 2, wherein the clamping sleeve is received in a clamping cylinder, an annular chamber of which is delimited in portions by the clamping sleeve, and which is connected via a connection passage with the pressure chamber of the power converter.

4. The drive unit in accordance with claim 3, wherein the intermediate part and the clamping cylinder are guided on at least one of the rods of the injection molding machine through the intermediary of a guide plate.

5. The drive unit in accordance with claim 4, wherein the guide plate contacts in the axial direction the clamping cylinder and the intermediate part.

6. The drive unit in accordance with claim 2, wherein the support anchor is supported on one side on the frame, and the clamping sleeve is movable along a free end portion of the support anchor.

7. The drive unit in accordance with claim 2, wherein the support anchor and/or the clamping sleeve are resiliently biased into a supported position.

8. The drive unit in accordance with claim 4, wherein a guide mechanism between the rod and the guide plate is lubricated.

9. The drive unit in accordance with claim 3, wherein the intermediate part is a cylinder in which the two piston units having a smaller and a larger effective surface and the pressure chamber are received, wherein the cylinder includes a pressure port connected with the pressure chamber, which is connected via the connection passage with the annular chamber of the clamping cylinder.

10. The drive unit of claim 1, wherein the drive unit is one of a closing unit, an injection unit, and an ejector of the injection molding machine.

11. The drive unit of claim 1, wherein the smaller piston unit is electrically driven.

12. The drive unit of claim 10, wherein the smaller piston unit is electrically driven.

* * * * *